Oct. 9, 1951 P. K. CHATTERJEA ET AL 2,570,207

SYNCHRONIZING ARRANGEMENT FOR MULTIPLEX ELECTRICAL PULSE COMMUNICATION SYSTEMS

Filed Jan. 4, 1946 3 Sheets-Sheet 1

INVENTOR
PRAFULLA KUMAR CHATTERJEA
LESLIE WILFRED HOUGHTON
BY
Edward [signature]
ATTORNEY Oct. 9, 1951 P. K. CHATTERJEA ET AL 2,570,207

SYNCHRONIZING ARRANGEMENT FOR MULTIPLEX ELECTRICAL PULSE COMMUNICATION SYSTEMS

Filed Jan. 4, 1946 3 Sheets-Sheet 2

INVENTOR
PRAFULLA KUMAR CHATTERJEA
LESLIE WILFRED HOUGHTON
BY Edward D. Phinney
ATTORNEY Oct. 9, 1951 P. K. CHATTERJEA ET AL 2,570,207

SYNCHRONIZING ARRANGEMENT FOR MULTIPLEX ELECTRICAL PULSE COMMUNICATION SYSTEMS

Filed Jan. 4, 1946 3 Sheets-Sheet 3

INVENTOR
PRAFULLA KUMAR CHATTERJEA
LESLIE WILFRED HOUGHTON
BY Edward D. Phinney
ATTORNEY Patented Oct. 9, 1951 2,570,207

UNITED STATES PATENT OFFICE 2,570,207

SYNCHRONIZING ARRANGEMENT FOR MULTIPLEX ELECTRICAL PULSE COMMUNICATION SYSTEMS

Prafulla Kumar Chatterjea and Leslie Wilfred Houghton, London, England, assignors, by mesne assignments, to International Standard Electric Corporation, New York, N. Y., a corporation of Delaware Application January 4, 1946, Serial No. 639,130
In Great Britain January 3, 1945

Section 1, Public Law 690, August 8, 1946
Patent expires January 3, 1965

6 Claims. (Cl. 179—15)

The present invention relates to multichannel electric pulse communication systems of the kind in which the channels are each carried by a corresponding train of pulses, and is concerned particularly with the synchronising arrangements for such systems.

In such systems it is usual to divide the signalling time into a number of successive equal periods and to transmit in turn during each period one pulse from each train of channel pulses. The repetition period of each train of channel pulses is equal to each of the above-mentioned equal periods, and the number of pulses transmitted in each period is equal to the number of channels of the system.

Each train of channel pulses may be time-phase or time-duration modulated by the signals or intelligence to be conveyed over the channel. In order to enable the modulated trains of pulses to be separated at the receiving end and to be directed into corresponding individual demodulating circuits, it is necessary to provide some means of synchronising the transmitting and receiving ends. This means consists in the periodic transmission of a recognisable feature or signal which is distinguished in the receiver from the channel signals and used to condition it to respond at the right times to the channel pulses and to direct them into the proper demodulating circuits.

One common synchronising arrangement is to transmit a train of synchronising pulses or signals having the same repetition period as that of one of the channel pulse trains, such pulses or signals having some feature (such as form or amplitude) by which they can be distinguished by the receiver from the channel pulses. These pulses or signals then can be regarded as defining the above-mentioned equal periods into which the signalling time is divided.

Most synchronising arrangements which have been used hitherto are complex and liable to become ineffective when interference is present. A failure of the synchronising system puts the whole communication system out of order. Many such synchronising systems occupy an excessive amount of signalling space (either by occupying the whole or part of the time intervals which could otherwise have been allotted to an extra communication channel, or by widening the frequency band which must be allotted to the system, or if this band cannot be widened by correspondingly degrading the communication channels), and may be the cause of interchannel interference due to cross-modulation, for example.

The principal object of the present invention is to provide a synchronising signal for a modulated pulse system which is not easily affected by interference and is not liable to produce cross-modulation, and which occupies a minimum of signalling space.

According to the invention the synchronising signal comprises a periodic wave which is transmitted to the receiving end by operating on the pulses in such a manner that the combined train formed by mixing the channel trains together is modulated in accordance with the said periodic wave, such modulation being additional to the normal modulation of each train by its own signals.

The invention will be described with reference to the accompanying drawings in which Fig. 1 shows a block schematic circuit diagram of a two-way pulse communication system according to the invention;

Figure 1:
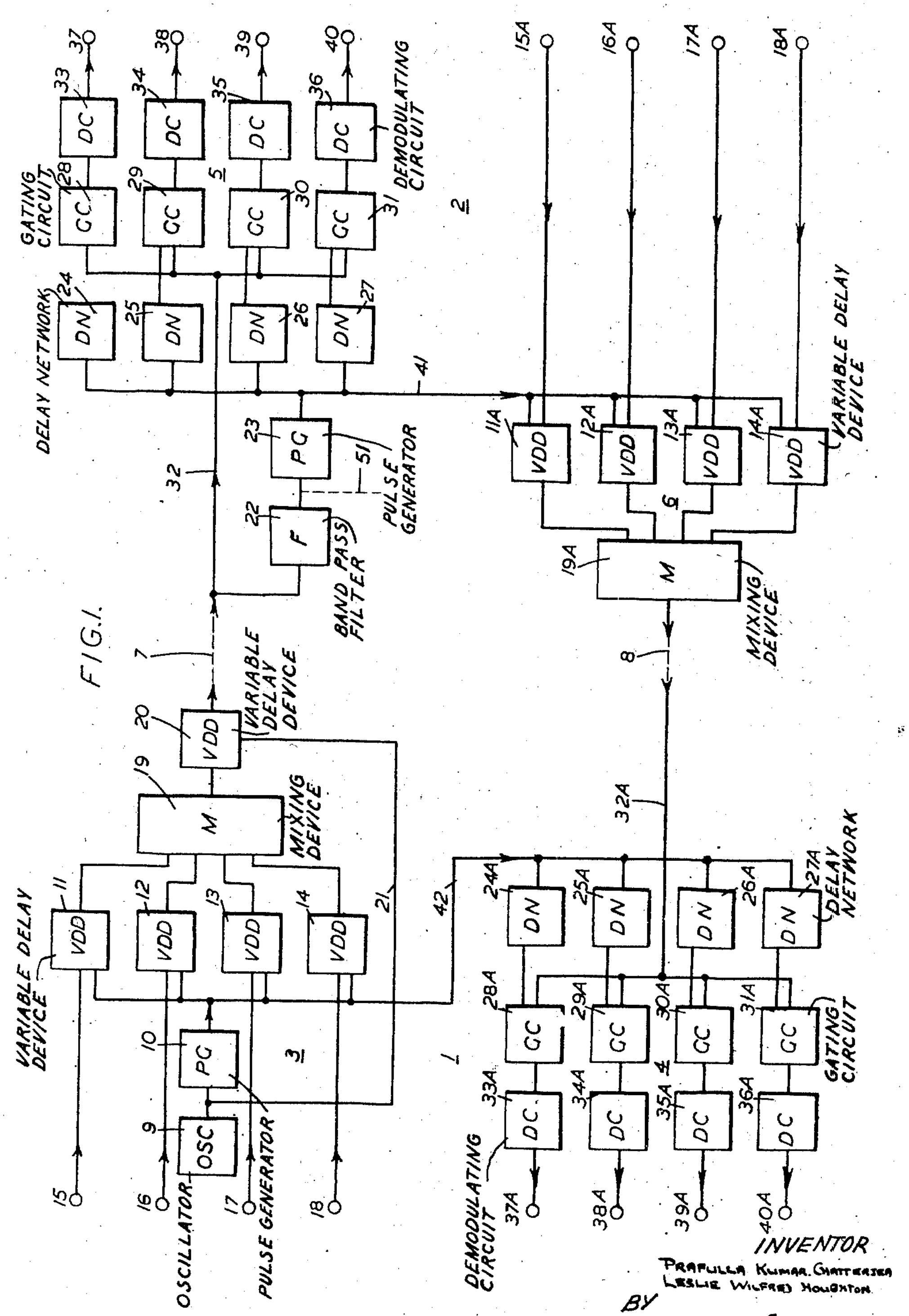

Referring first of all to Fig. 1, there is shown a two-way pulse communication system according to the invention, connecting two stations 1 and 2. For the purpose of illustration a four-channel system is shown, but the arrangement is similar for any number of channels. At station 1 there are located a transmitting circuit 3 and a receiving circuit 4, and at station 2 a corresponding receiving circuit 5 and transmitting circuit 6. The circuits 3 and 5 are connected over a communication medium of any type represented by the dotted line 7, and circuits 4 and 6 are connected by a similar medium shown dotted at 8. Either communication medium may be a cable or other wired circuit, a carrier channel over such a cable or circuit, or a radio link, for example. Any necessary arrangements for modulating and demodulating a carrier or radio wave with the pulses of the communication system are supposed to be included in the communication medium represented by the dotted line 7 or 8 and may be of any known type which it is not necessary to describe.

The transmitting circuit 3 at station 1 comprises a periodic wave master generator 9 connected to a pulse generator 10. These elements may be of any suitable type, and are so disposed as to generate a train of short electric pulses preferably having the same repetition period as the waves from the generator 9. The repetition period of the pulses could, however, be any rigidly controlled multiple of the period of the periodic waves. It will be assumed that these waves are sinusoidal but this is not essential, so long as they are periodic; for example saw-tooth waves could be used. The train of pulses from the pulse generator 10 is applied simultaneously to the input terminals of four variable delay devices 11, 12, 13 and 14 corresponding respectively to the four channels assumed for the system. The modulating signals for these channels are applied respectively to the input terminals 15, 16, 17 and 18 connected respectively to the four delay devices. Each of these devices is of such a nature that the modulating signal voltages vary or modulate the time by which the pulses applied to the device are delayed thereby. Thus the pulses are obtained at the output of each of the delay devices after a delay which depends on the modulating signal voltage; in other words the output pulses are time-phase modulated in accordance with the signal.

Examples of time delay devices having this property are fully described in the specification of the co-pending United States application No. 639,131 and information can be obtained by reference to that specification. It will, however, be briefly stated here that in this type of delay device the incoming pulse initiates a single saw-tooth wave from a relaxation oscillator circuit, which saw-tooth wave causes a valve device to emit a pulse after a delay determined by the bias of the valve, this bias being varied by the applied modulating signal voltage, thus producing time-phase modulated pulses. In this type of device, also, time-duration modulated pulses may be produced at an intermediate stage and such pulses may be extracted and utilised if desired.

Each of the devices 11 to 14 also contains means for introducing an adjustable delay which is fixed in the sense that it is not affected by the modulating signals. The fixed delay in each of the delay devices 11 to 14 is set so that when no modulating signals are applied, the output pulses emitted by each in turn for each single input pulse are spaced suitably in time in the interval between two successive input pulses, for example they could be equally spaced in this interval. The output pulses from the devices 11 to 14 are then combined in a mixing device 19, which may be of any convenient type, but should preferably include buffer valves or the like in the output leads from the delay devices to prevent undesirable reactions between them. Thus the four channel pulse trains will be obtained combined together at the output of the mixing device, and when the modulating signals are applied, each of the trains will be time-phase modulated with its own series of signals.

According to the invention, the output of the mixing device 19 is connected to another variable delay device 20, similar to the devices 11 to 14, which is controlled by waves obtained directly from the output of the periodic generator 9 over the conductor 21. The result of this is to time-phase modulate the combined pulse trains with the sinusoidal wave (or other periodic wave) from the generator 9, and this modulation is added to or combined with the individual modulation of the channel pulse trains by the corresponding signals.

Figure 4:
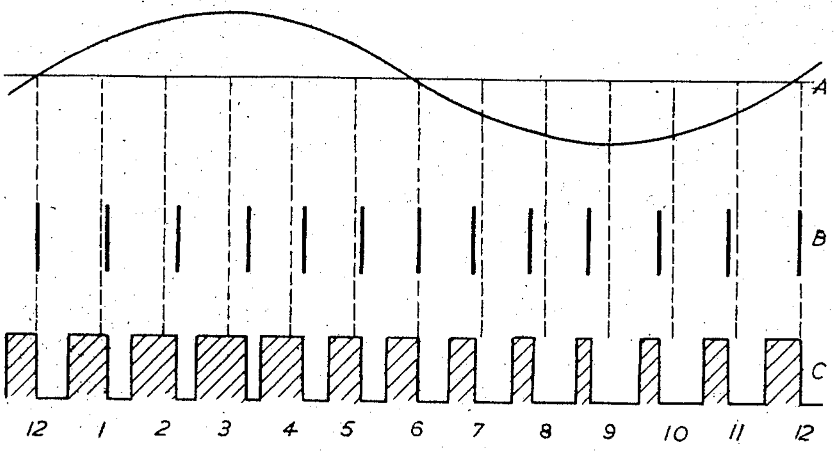
Fig. 4 shows explanatory diagrams.

The consequences of this double modulation of the combined pulse trains will be better appreciated by reference to the diagrams of Fig. 4.

Diagram A of Fig. 4 shows the sine-wave voltage derived from the output of the periodic generator 9 in relation to time, which is measured horizontally. In order to make the matter clear it will be assumed that the system is a twelve channel system, in which case there would be 8 more of the delay devices connected in parallel with the devices 11 to 14. It will be also assumed for clearness that the period of the waves from the generator 9 is 60 microseconds. In the absence of applied modulation, the fixed delay of the devices 11 to 14 etc. should preferably be adjusted so that the pulses at the output of the mixing device 19 are equally spaced 5 microseconds apart as indicated by the vertical dotted lines in Fig. 4. The effect of the sine-wave modulation applied to the delay device 20 over the conductor 21 will be to displace the pulses by amounts depending on the instantaneous wave voltage at the times of the input pulses applied to the delay device 20, so that some are late and others early. The times of the output pulses are indicated by the solid vertical lines at B, Fig. 4. It will be seen that the times of the pulses corresponding to channels numbered 6 and 12 are unaffected since the sine-wave is passing through zero voltage at the times of the corresponding input pulses, while the effect on the pulses of channels 3 and 9 is a maximum, the former being late and the latter early. The general effect is to crowd together the pulses centered on either side of channel pulse 6 and to spread apart those centered on either side of channel pulse 12. It is to be noted that all the pulses of any given channel will still be spaced apart by the standard interval of 60 microseconds, because this is also the period of the sine-wave, and so all the pulses of any one channel will be late or early by a fixed interval. On the application of the individual signal modulating voltages the channel pulses will be shifted about on either side of the zero positions indicated by the full lines of Fig. 4B. The superposed sine-wave modulation therefore has no effect on the modulation of the individual channel pulse trains, but only affects their mutual spacing. The crowding together of some of the channel pulses means that the permissible depth of modulation of these channels must be slightly reduced, and this is equivalent to a small reduction in the channel signalling space in order to provide some space for the synchronising signal, which is the sine-wave modulation of the combined pulse trains.

Since the signal modulating frequencies will be low compared with the frequency of the sine-wave, the modulating sine-wave can be easily extracted from the time-phase modulated combined pulse train at the receiving end. This is done in the receiver 5 in the simplest way by means of a band pass filter 22, for example, adapted to accept the sine-wave frequency, since it will easily exclude both the much higher repetition frequency of the combined pulse train and the much lower modulating signal frequencies. Thus at the output of the filter 22 is obtained a replica of the output of the generator 9 in a fixed phase relation thereto. This extracted wave is applied to a pulse generator 23 similar to 10. The pulses from 23 are applied through suitable adjustable delay networks 24, 25, 26, 27 to gating circuits 28, 29, 30, 31.

The combined modulated pulses are applied over the conductor 32 to all the gating circuits in parallel and the individual channel pulses are admitted by them at the right times to the corresponding demodulating circuits 33, 34, 35, 36 according to known practice, the corresponding demodulated signals being obtained at the output terminals 37, 38, 39 and 40.

The delays introduced by the networks 24 to 27 are set so that the gates are opened at the times when corresponding modulated channel pulses are due, and since the spacing of the pulses of different channels is affected by the synchronising sine-wave, the setting of these delays will be likewise affected. Since, however, as already explained, the effect of the sine-wave modulation on the spacing is constant in every period, the setting of the delay networks will not have to be altered unless the amplitude of the modulating sine-wave is changed.

For the opposite direction of transmission, it is not always necessary to repeat the synchronising arrangements, so that the transmitting circuit 6 and receiving circuit 4 can both be slightly simpler than the corresponding circuits 3 and 5. It is not necessary to supply elements corresponding to 9, 10, 20, 22 or 23. The remaining elements may be the same as the corresponding elements of circuits 3 and 5, and have been given the same designation numbers followed by the letter A.

In the transmitting circuit 6, the channel pulses are derived from the pulse generator 23 over the conductor 41, which is connected in parallel to the input sides of the variable delay devices 11A to 14A in the same way as the generator 10 is connected to the devices 11 to 14. Likewise the pulses for the gating circuits 28A to 31A of the receiving circuit 4 are obtained from the pulse generator 10 over the conductor 42 which is connected to the input sides of the delay networks 24A to 27A. Strict synchronism of these two pulse generators is ensured by the synchronising wave transmitted from circuit 3 to circuit 5, so that there will be strict synchronism between circuit 6 and circuit 4. The adjustments are made in the same way as before, but it is to be noted that the spacing of the pulses of different channel pulse trains can be equal, since they do not have to transmit a synchronising wave.

There may, however, be cases where it is impracticable to tie together for synchronising purposes the equipments for the two directions of transmission. This may happen with mobile communication systems. In such cases, the connections 41 and 42 are omitted, and the circuits 4 and 6 are then provided with elements (not shown) corresponding to 22, 23, 9, 10 and 20, respectively, and the equipment for both directions of transmission becomes identical. It then comprises two separate one-way systems.

In the detailed explanation which has been given so far, it has been assumed that time-phase modulation of the pulse trains has been employed. The arrangement of Fig. 1 can be used without any substantial alteration if time-duration modulated pulses are to be used over the communication medium. It has already been mentioned that time-duration modulated pulses may be obtained from the variable delay device 20 if of the type described in the above quoted specification. These pulses may have fixed leading edges and trailing edges which are modulated both by the channel signals and by the sine wave from the generator 9. In the absence of the signal modulation the pulses at the output of the device 20 may appear as shown at C, Fig. 4. The leading edges are fixed with reference to the dotted lines but the times of the trailing edges depend on the applied sine-wave A and may, for example, coincide in time with the pulses B. The durations of the successive pulses in any period of the sine-wave vary with the instantaneous voltage of the wave at the times of the pulses applied to the input of the device 20, but as already explained all the pulses of any channel pulse train will have the same duration characteristic of the channel in the absence of any signal modulation, and this signal modulation produces a variation about this characteristic duration.

The sine-way may be extracted from the duration modulated pulses in the receiving circuit 5 by means of the filter 22 and gating and demodulation proceeds as explained according to known principles.

If time-duration modulated pulses cannot be conveniently obtained from the device 20, it may be followed by a suitable element of known type (not shown) adapted to derive time-duration modulated pulses from the time-phase modulated pulses generated by the device.

It is not necessary that the type of time modulation of the pulses by the sine-wave should be the same as the type of modulation by the channel signals. For example, the channel pulses could be time-phase modulated by the corresponding channel signals and time-duration modulated by the sine-wave.

It will be seen that in the arrangement of Fig. 1 there are thirty-nine elements, seventeen of which are time delay devices which can all be similar if desired. Besides these time delay devices there are only six other different types of elements.

It is further to be noted that if desired, amplitude modulation of the mixed channel pulses by the synchronising sine wave or other periodic signal could be used instead of time-phase or time-duration modulation. In such a case, of course, the element 20 of Fig. 1 would take the form of an amplitude modulator of any suitable type and it could then no longer be similar to the elements 11 to 14.

When time modulation is employed for the synchronizing signal, however, it is to be noted that the amplitude of the modulating periodic wave may be quite small, so that the depth of the modulation thereby is small compared with the depth of the signal modulation of the individual channel pulse trains. Thus the channel space which must be allowed for the synchronising signal can be much less than the space occupied by a train of synchronising pulses such as are commonly employed in the known arrangements. It is necessary to point out at this stage that while no difficulty will be experienced in working the system of the invention when the number of channels is relatively large, say six or more, with fewer channels the matter requires some further consideration. Actually the synchronising wave can be quite satisfactorily defined if there are only five channels, and in the case of only three channels, practicable results are still possible if certain heterodyne whistles which may occur in this case are not objectionable; such whistles might not seriously affect the intelligibility of a speech channel. In special cases even only two channels are possible where the timing of the signal modulated pulses can be definitely controlled with reference to the phase of the synchronising wave, such as would be possible in telegraph channels, but not in speech channels.

There are other ways of producing the desired modulation of the combined pulse train in accordance with the periodic synchronising signal, besides that described for the transmitting circuit 3 of Fig. 1. Two alternative methods will be described with reference to Figs. 2 and 3 respectively.

Figure 2:
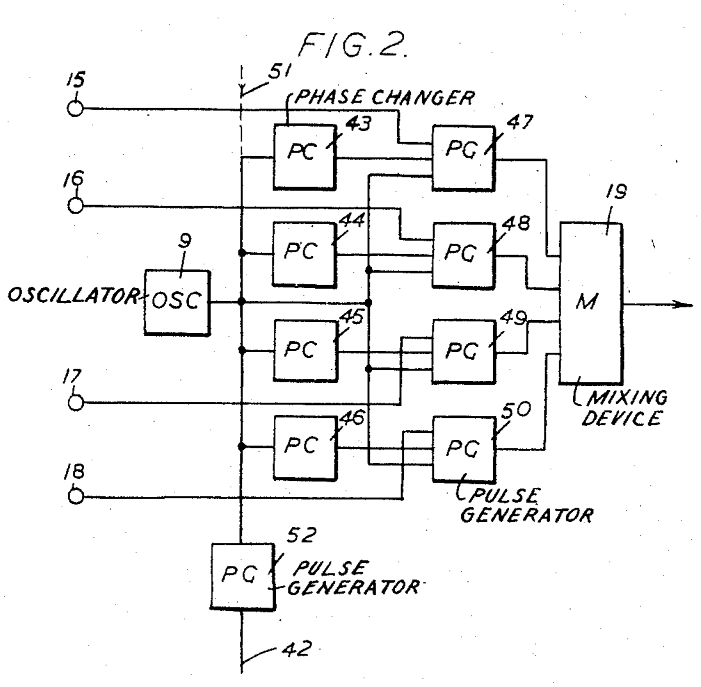
Fig. 2 shows a modified form of the pulse transmitting arrangements.

Referring to Fig. 2, the master periodic wave generator 9 is connected to four fixed phase changing circuits 43, 44, 45, 46 each leading to one of four pulse generators 47, 48, 49, 50. The phase change in each of the circuits 43 to 46 is adjusted so that in the absence of any modulation the four generators 47 to 50 emit four trains of channel pulses of which corresponding pulses are equally spaced in the period of the sine-wave or other periodic wave from the generator 9. The usual signal voltages are applied at terminals 15 to 18 to modulate the times of occurrence of the channel pulses according to well known practice. The waves from the generator 9 are also applied directly to all the pulse generators 47 and 50 so as to provide a further modulation of the pulses depending on the instantaneous amplitude of the periodic wave at the times when the pulses are due to be emitted. Since, as before, the period of the sine-wave is the same as that of each individual pulse train, all the pulses of any train will be shifted by the same amount by the sine-wave modulation. The pulse trains from the four generators are mixed together in the device 19 as before and transmitted over the communication circuit.

The double modulation of each of the pulse generators 47 to 50 by the channel signals and by the synchronising wave for the generator 9 may be accomplished by simply adding the corresponding voltages together in a modulation resistance, for example by applying the voltages to corresponding taps on a grid leak of a modulating valve in the pulse generator. In order to avoid interchannel cross talk, however, the synchronising wave voltages should preferably be applied through buffer circuits to prevent a general mixture of the channel modulating signals in the circuits of the generator 9.

In the case of a two-way system arranged as in Fig. 1, the generator 9 may be omitted when the arrangement of Fig. 2 takes the place of the transmitting circuit 6. In this case the sine-wave is obtained from the filter 22 of the receiving circuit 5 over the conductor 51 shown dotted in Figs. 1 and 2. In order to supply pulses to the simplified receiving circuit 4 when the transmitting circuit of Fig. 2 is in the position 3 of Fig. 1 an additional pulse generator 52 controlled by the generator 9 is provided, the output of which is supplied to circuit 4 over the conductor 42 as before.

Figure 3:
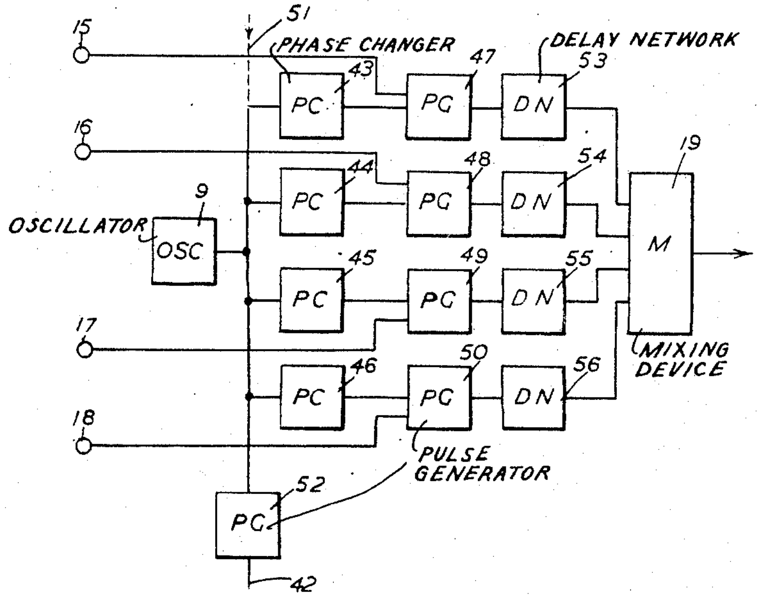
Fig. 3 shows another modification of the transmitting arrangements.

The transmitting arrangement of Fig. 3 differs from that of Fig. 2 in that the four pulse generators 47 to 50 are designed for modulation only by the signals applied at the terminals 15 to 18. The pulse generators are followed respectively by delay devices or networks 53 to 56, each of which is adjusted to introduce a different fixed delay for all the pulses of one channel pulse chain corresponding to the displacement which would be produced by the sine-wave modulation, as illustrated, for example, at B in Fig. 4. Although the sine-wave is not actually applied to the pulses to produce the modulation, the effect of the delay devices 53 to 56 on the pulses of all the trains combined in the device 19 is indistinguishable from the modulating effect produced by the sine wave in Fig. 1 or 2. It is to be noted, however, that with this arrangement, the modulation, effectively produced by the networks 53 to 56 can, if desired, be different in form from the periodic waves from the generator 9.

As in the case of Fig. 2 an extra pulse generator 52 may be provided for supplying pulses to the receiving circuit 4 (Fig. 1) for two-way operation, and when the arrangement of Fig. 3 is used as the transmitting circuit 6, the generator 9 may be omitted, and the waves for operating the pulse-generators 47 to 50 may be obtained over the dotted conductor 51.

Since the modulated pulse trains obtained at the output of the device 19 in Figs. 2 and 3 are identical with those obtained therefrom in the case of Fig. 1, the same receiving circuits 4 and 5 can be used with either of these modified transmitting circuits.

It will, of course, be understood that when the number of channels in the system differs from four, the corresponding number of delay devices and pulse generators in Fig. 2 or 3 will be supplied.

A further simplification of Fig. 3 is possible by the omission of the delay devices 53 to 56. The effect of the synchronising signal modulation may then be obtained by 20 modifying the phase changes introduced by the phase changing circuits 43 to 46 so that the pulses obtained from the mixing device 19 are effectively modulated in accordance with the synchronising signal.

Which of the three transmitting arrangements which have been described to illustrate the invention is most suitable for use in any case depends on the circumstances. The arrangement of Fig. 1 is likely to be the most advantageous from the point of view of minimum inter-channel cross talk. Fig. 3 is perhaps the simplest arrangement but is only applicable if time modulation by the synchronising signal is employed. Fig. 2 would tend to produce high interchannel cross talk, and to prevent this it would usually be necessary to complicate the pulse generations 47 to 50 by introducing buffer amplifying stages in the modulating paths from the generator 9, as already mentioned above. Both the arrangements of Figs. 1 and 2 enable the depth of modulation by the synchronising signal to be easily varied, this facility not being available in Fig. 3. Various other considerations will also have a bearing upon the applicability of the several arrangements in specific cases.

What is claimed is:

1. A transmitting arrangement for a multi-channel electric pulse communication system comprising means for generating a plurality of trains of channel pulses having the same reptition frequency but differently phased, means for time modulating each of the said trains in accordance with a signal to be carried by the channel, means for mixing together all the said trains to produce a combined train of pulses, means for time modulating the said combined train in accordance with a periodic synchronising signal, and means for transmitting the modulated combined train over a communication medium.

2. A multichannel electric pulse communication system comprising means for generating a plurality of trains of channel pulses having the same repetition frequency, but differently phased, means for time modulating each of the said trains in accordance with a signal to be carried by the channel, means for mixing together all the said trains of channel pulses to produce a combined train of pulses, means for operating upon the said pulses in such manner as to produce a time modulated train in accordance with a periodic synchronising signal, means for transmitting the modulated combined train over a communication medium to a reciving device, means in the receiving device for demodulating the combined train of pulses to recover the synchronising signal, and means in the receiving device for applying the recovered synchronising signal to direct the respective trains of channel pulses into corresponding demodulating channels for the recovery of the corresponding modulating signals.

3. A two-way multichannel electric pulse communication system according to claim 2 further comprising a simplified transmitting arrangement synchronised by the said receiving device connected over a communication medium to a simplified receiving arrangement synchronised by the said generating means, the said simplified transmitting arrangement being adapted to generate and mix together for transmission over the last mentioned medium a plurality of trains of channel pulses each train being time modulated in accordance with a signal to be conveyed over the said channel, and the said simplified receiving arrangement being adapted to separate and individually to demodulate the said trains of channel pulses.

4. A transmitting arrangement or communication system according to claim 1 in which the period of the said synchronising signal is the same as that of each of the channel pulse trains.

5. A transmitting arrangement according to claim 1 comprising a periodic wave generator adapted to control a pulse generator for the generation of a train of pulses having the same period as the waves from the generator, means for applying the train of pulses to a plurality of variable delay devices corresponding respectively to the channels, in such manner as to generate the said plurality of trains of channel pulses, means for applying the corresponding channel modulating signals to vary the delay introduced by each of the said variable delay devices in such manner as to time modulate the corresponding train of channel pulses, means for mixing the modulated trains of channel pulses to form a combined train of pulses, means for applying the combined train of pulses to a common variable delay device, and means for applying the waves generated by the said periodic wave generator to vary the delay introduced by the said common variable delay device in such manner as to time modulate the combined train of pulses.

6. A transmitting arrangement according to claim 1 in which the waves generated by the periodic wave generator are substantially sinusoidal.

PRAFULLA KUMAR CHATTERJEA.
LESLIE WILFRED HOUGHTON.

REFERENCES CITED

The following references are of record in the file of this patent:

UNITED STATES PATENTS

| Number | Name | Date |
|---|---|---|
| 1,928,093 | Coyle | Sept. 26, 1933 |
| 2,007,809 | Nicolson | July 9, 1935 |
| 2,395,467 | Deloraine | Feb. 26, 1946 |
| 2,406,790 | Beatty | Sept. 3, 1946 |
| 2,408,077 | Labin | Sept. 24, 1946 |
| 2,418,116 | Grieg | Apr. 1, 1947 |